US012420987B1

(12) United States Patent
Levy

(10) Patent No.: US 12,420,987 B1
(45) Date of Patent: Sep. 23, 2025

(54) REINFORCED PAPER BAG

(71) Applicant: Peter L. Levy, San Francisco, CA (US)

(72) Inventor: Peter L. Levy, San Francisco, CA (US)

( * ) Notice: Subject to any disclaimer, the term of this patent is extended or adjusted under 35 U.S.C. 154(b) by 0 days.

(21) Appl. No.: 19/076,933

(22) Filed: Mar. 11, 2025

(51) Int. Cl.
*B65D 33/02* (2006.01)
*B31B 70/86* (2017.01)
*B65D 33/10* (2006.01)
*B31B 160/20* (2017.01)

(52) U.S. Cl.
CPC ............ *B65D 33/02* (2013.01); *B31B 70/876* (2017.08); *B65D 33/105* (2013.01); *B31B 2160/20* (2017.08)

(58) Field of Classification Search
CPC .... B65D 33/02; B65D 33/105; B31B 70/876; B31B 2160/20
USPC ...................................................... 383/18, 20
See application file for complete search history.

(56) References Cited

U.S. PATENT DOCUMENTS 1,901,858 A * 3/1933 Fischer .................. B65D 33/12 383/18
2,980,312 A * 4/1961 Gould ...................... A45C 3/04 383/18

FOREIGN PATENT DOCUMENTS

EP 0275239 A2 * 7/1988
GB 1071296 A * 6/1967

* cited by examiner

*Primary Examiner* — Jes F Pascua
(74) *Attorney, Agent, or Firm* — Walt Froloff

(57) ABSTRACT

A reliable leakage resistant reinforced paper bag having reinforcement strips coupling the two handles and traversing the bag handle sides, spanning the bottom and coupled to the opposite bag side handle while increasing reliability and carrying capacity of the bag.

12 Claims, 6 Drawing Sheets

REINFORCED PAPER BAG

BACKGROUND

Field of the Inventions

The field of the present invention relates generally to bags, and more particularly to paper bags having strengthened bottoms, sides, handles and methods of manufacturing tougher paper bags.

Background and Description of the Prior Art

Bags can come in many flexible materials, including cloth, fiber, plastic and paper. The bags most in need of strengthening are the paper bag. A paper bag is a bag composed of paper, usually kraft, from pulp produced by the kraft process. Paper bags can be made either with virgin or recycled fibers to meet requirements. Paper bags are most commonly used as shopping carrier bags and for packaging of some consumer goods. They carry a wide range of products from groceries, glass bottles, clothing, books, toiletries, electronics and various other goods. Bags can also function as means of transport in day-to-day activities.

The wide range of products from groceries have caused a gradual movement from the traditional at first cloth, then to paper to what is mostly now used and toxic to the environment and ecosystems, plastic.

The estimate for the number of paper and plastic bags sold annually in the US has changed dramatically over the last several decades. For paper bags: the US market is approximately 10 billion paper grocery bags per year. This accounts for large grocery-style paper bags, though this number may vary depending on what exactly qualifies as large. For plastic bags: Americans use approximately 100 billion plastic shopping bags annually. This includes standard plastic grocery and retail bags.

These figures are estimates based on industry reports from recent years. The actual numbers may vary based on changing consumer behaviors, retail practices, and environmental regulations. Many states and municipalities have introduced bag fees or bans that have affected usage patterns but made no dent in the proliferating market for plastic bags. Some municipalities have banned the plastic bag along with other plastics for all of the various and different environmental damages that are caused by the 100 billion plastic shopping bags and other plastics that are tossed every year. This also does little to stem the tide of plastic bag use.

There previously predominant carrier technology paper bags are encouraged because they are easily re-cycled and do not pollute or cause environment damage. Yet all efforts to reverse the trend from paper to plastic bags have shown to be non-persuasive. Moreover, paper bag handles have been improved to handle the heavier loads required today. This has also not stemmed the tide for the paper bag. Perhaps this is because a problem with the classic paper bag is their inherent weakness at the bottom. Excessive weight, volume or dampness will develop tears and rips, usually at the worst possible time. This is the sole explanation for the shift originally from paper to plastic, as the plastic bags are not susceptible to dampness or leaks from items within, and they stretch before they tear.

The wide range of consumer goods from groceries, glass bottles, clothing, books, toiletries, electronics and various other goods has grown in over all weight, volume and quantity creating paper bags known to tear where they for typical loads. Many customers desiring paper bags are forced to request a "double bag it please". But there is still that need to go back to paper and reduce or eliminate the plastic bag altogether.

Many methods to strengthen the paper bag have been tried. For example: an added piece of cardboard at the bottom inside the bag, folded bottom corners inward to create a more stable base, and add packing tape along the bottom seams.

Handle strengthening are prominent in the prior art. Added strips of packing tape vertically along the length of the bag where handles are attached, taping the top edges to provide some bag grip, adding cloth, twine reinforced or nylon handles using strong adhesive or staples are partial solutions used.

Paper bag side reinforcement methods are also found, some individually and some from manufacturing. These include: packing tape vertically along the creases, adding tape horizontally around the middle of the bag, But the problem persists, most shoppers will choose plastic over paper, ten times more often. What is needed is a paper bag that is strong and resilient as is the plastic bag, yet still adequate for carrying the typical shopping load and groceries home without a bag tearing mishap or catastrophic bag failure.

What is needed is a recyclable reusable paper bag the is strong and with reinforced components to allow you to carry a bag of typical heavier weight items like milk, canned food, juice, meat, water, carbonated drinks, beer, wine, etc items without worry of losing the groceries somewhere between the store and home due to bag rips and tears.

For the current paper bag manufacturing, components advancing the paper roll for the glue position, bag bottom-sealing, motor for gluing/filling/sealing and high pressure application of white latex are done with automation by a single machine. It is anticipated that the incremental addition of material and processing would not be a substantial change in cost, once the factory machine changes needed are made. What is needed are minimum changes in the paper bag manufacturing process to make stronger paper bags without undue extra expense.

The prior art to create stronger paper bags has gone to multi-layered paper bags. While this makes the overall paper bag stronger, the handle, where there is one, becomes the weak link in heavier grocery loads. For this reason multi-layered paper bags are mostly used for more reliable mail packages, not groceries. The grocery paper bag solution is still just to double bag the groceries and hope that the handle can handle double the stress. What is needed is a full paper bag solution without double the material and time to "double bag".

SUMMARY

The present invention discloses a reinforced paper bag beginning with the typical four lateral sides, a bottom and two handles at the bag top edge. The paper bag is reinforced with strips and two handles on opposite sides of the paper bag configured for carrying objects inside the paper bag. The two handles are coupled to at least one paper bag reinforcement strip, coupled to the paper bag and traversing the paper bag from one bag handle, across the bag bottom and to the opposite side bag handle. The reinforcement strip coupling of the two handles by a coupled traversing of the bag sides and bottom inside or outside adds reliability and carrying capacity to the bag. In some embodiments a manufacturing enhancement provides a reinforcement strip that is configured in a continuous loop forming the two opposing handles and two bag traversing reinforcement strips from a continuous loop which is coupled to the paper bag.

BRIEF DESCRIPTION OF DRAWINGS

Specific embodiments of the invention will be described in detail with reference to the following figures.

DETAILED DESCRIPTION

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

OBJECTS AND ADVANTAGES

The reinforced bag bottom disclosed herein addresses the above needs and concerns in the following manner.

An object of the invention is to provide a durable paper bag to provide environmental remediation moving away from the use and sale of competing plastic bags.

It is, therefore an object of the invention is to provide a paper bag resistant to bag bottom leakage and moisture to bag bottom causing tearing and spillage.

Another objective is to provide bag bottom tearing resistant to punctures, tearing or ripping from sharp surfaces of items carried in a bag.

A still further objective if the invention is to provide bag the even when punctured to resist or retard further tearing being held by supporting reinforced handles.

Yet another object is for a inflatable container that can integrate well with other individual inflatable containers to provide a greater strength and structural integrity from overload.

Another object is to reduce or eliminate the need for choosing plastic bags, toxic to the environment, over paper bags, naturally recyclable.

Yet another object is remove the need to double bag a grocery paper bag.

Another object of the invention is to provide a way to reduce the demand for plastic bags and to move the demand from plastic to paper bags.

Yet another aspect of the invention is to provide a more reliable paper bag without increase of costs of the current paper bag.

The present invention discloses several embodiments for a reinforced bottom paper bag.

Figure 1:
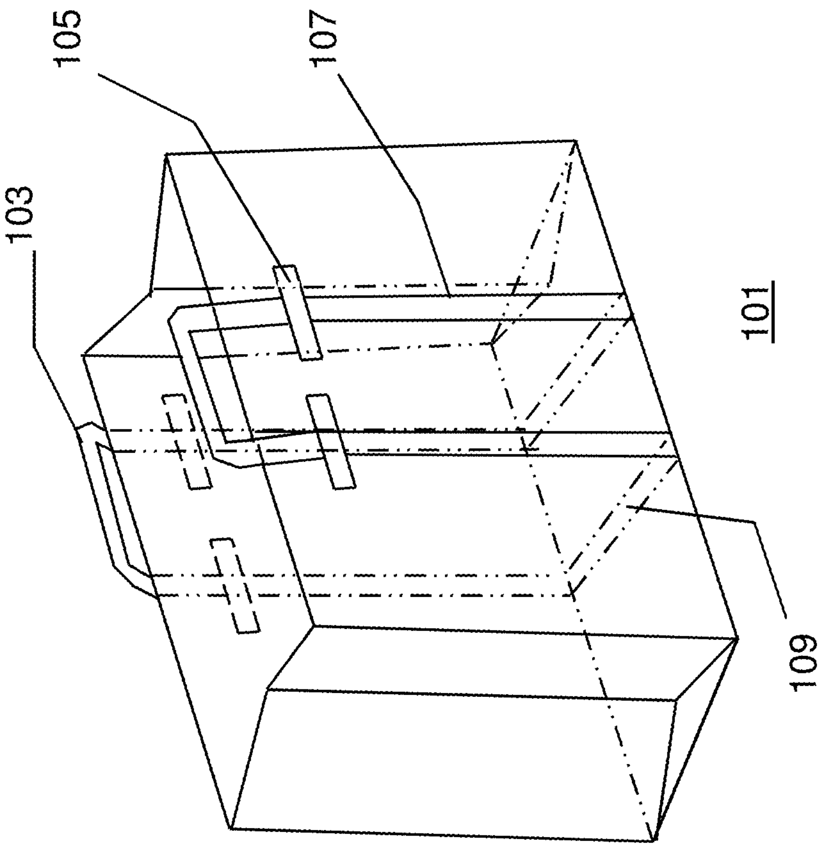
FIG. 1 shows a typical paper bag with bag support loops in an embodiment of the invention.

FIG. 1 shows a typical paper bag with bag support loops in an embodiment of the invention.

A bag reinforcement loop comprises coupled strips strengthening the bag handle 103, sides 107 and bottom 109. The all around bag loop handle 103 integrated with a paper bag 101 is an incremental solution to creating a more durable and resilient bag 101. Paper bag reinforcement strips 107 109 integrated with the bag handles 103 for a loop around the entire bag 101. In an embodiment the handles 103 are coupled to side reinforcement strips 107 at a anchor strip 105. The handle 103 tension is then partially absorbed at the handle anchor point 105 but also partially transferred to the side 107 reinforcement strip A reinforcement loop manages several things; strengthens the bag bottom to support package weight, advances the weight tension to the bag reinforced handles by reducing stress, stress discontinuity or stress risers at the handle anchor and pinch points. The focus of bag reinforced strengthening is for the entire paper bag on the typical failure points-handles 103, bottom surface, bottom seams, side surfaces and creases.

Paper bag reinforced handles 103 and bottom 109 reinforcement strip couplings can also strengthen binding and coupling paper by themselves being strengthened through a processes known as torrefaction, or layer enhancement from acrylic varnish and glues of all types when integrated with the paper bag reinforcement strips. In some an embodiment the present typical folded paper handles 103 can be doubled and firmly coupled at the anchor points 105 with all manner of glue adhesion, staples, plastic, thread or combinations. In another embodiment stronger paper handled can be used by strengthening the handle material or using another material.

In an embodiment of a reinforced paper bag includes a paper bag 101 with four lateral sides which may have folding creases, a bottom and two handles at the bag top edge. The two handles 103 on opposite sides of the paper bag are configured for carrying the contents inside the paper bag 101 where each handle 103 end is coupled to at least one paper bag reinforcement strip 107 109 with each bag reinforcement strip coupled to the paper bag 105 and traversing the paper bag transferring bag content load from one paper bag handle 103, across the bag side 107 and bottom 109 and to the opposite side handle.

Bag handle 103 strengthening can be formed from strips of adhesives or tape vertically along the length of the bag side 107 where handles are attached 105 or by folding and taping the top edges to provide more bag grip, or by adding cloth, twisted twine reinforced or nylon handles using strong adhesive or staples. All of these bag reinforcement coupling methods can be used in an embodiment for reinforcing bottom strips 109, and also through torrefication of bag 101 reinforcement loop or strips.

Figure 2:
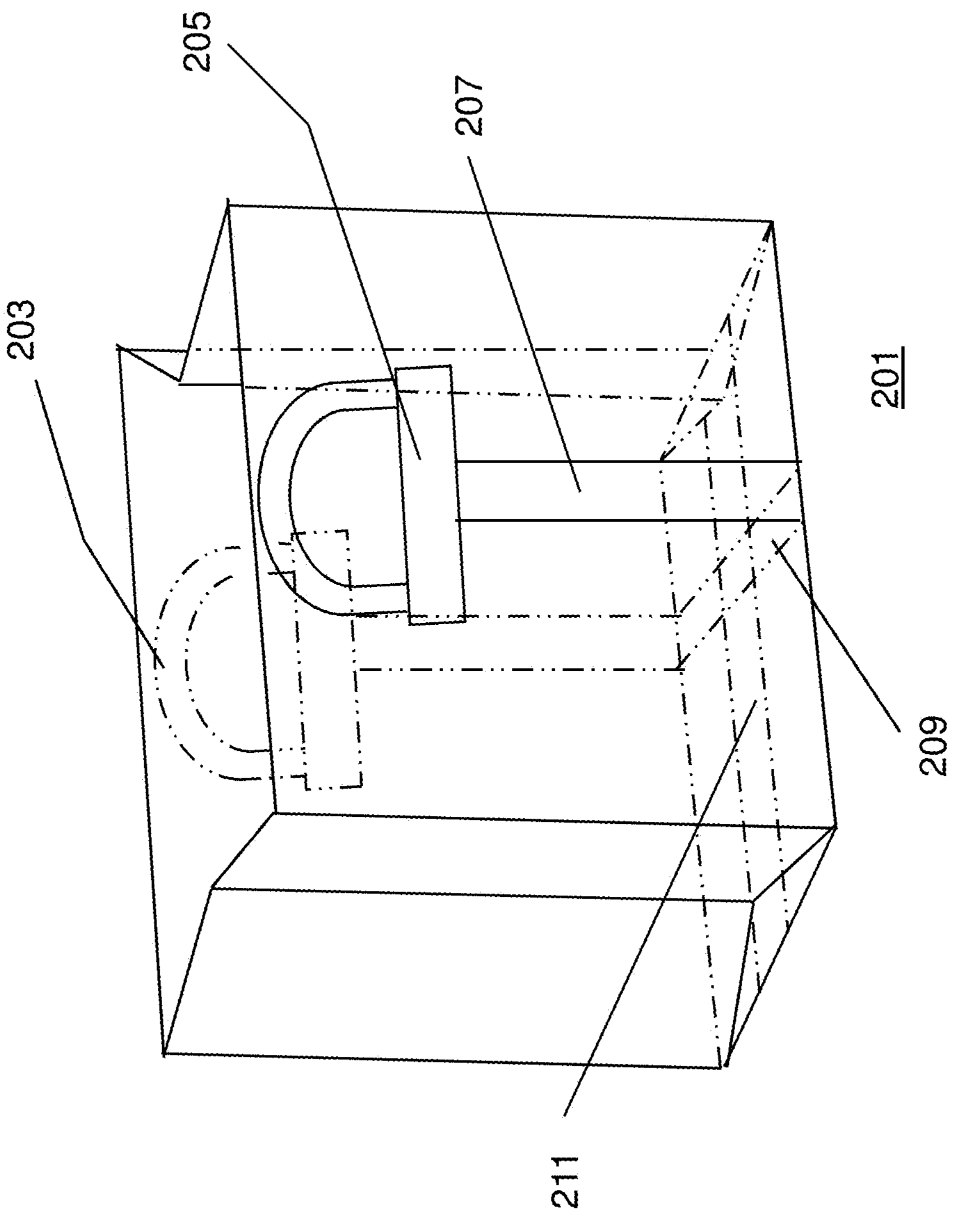
FIG. 2 shows a typical paper bag with embedded handles having a bag support loop in an embodiment of the invention.

FIG. 2 shows a typical paper bag 201 with embedded handles 203 having a bag support loop 207 in an embodiment of the invention.

Some paper bags have internal or embedded handles. These are not much more than bag cut-outs but they have some tiny cost advantages in manufacturing. They have all of the disadvantages of weakness in carrying capacity as the paper bag generic weakness is subject to tearing at the most important point on the bag, the handle. In an embodiment an embedded bag handle 203 is provided reinforcement from paper coupled strips 205 bordering the handle bag openings. In addition the reinforced handles 203 are a part of at least one reinforced loop coupled to and comprising a bag bottom surface strip 209, coupled to and handle side strips 207 traversing a paper bag from one handle across the bottom surface and to the opposite embedded handle. The bag bottom can also have an additional reinforcing strip 211 or pattern which is itself strengthening and supported by anchors at the bag side edges.

Figure 3:
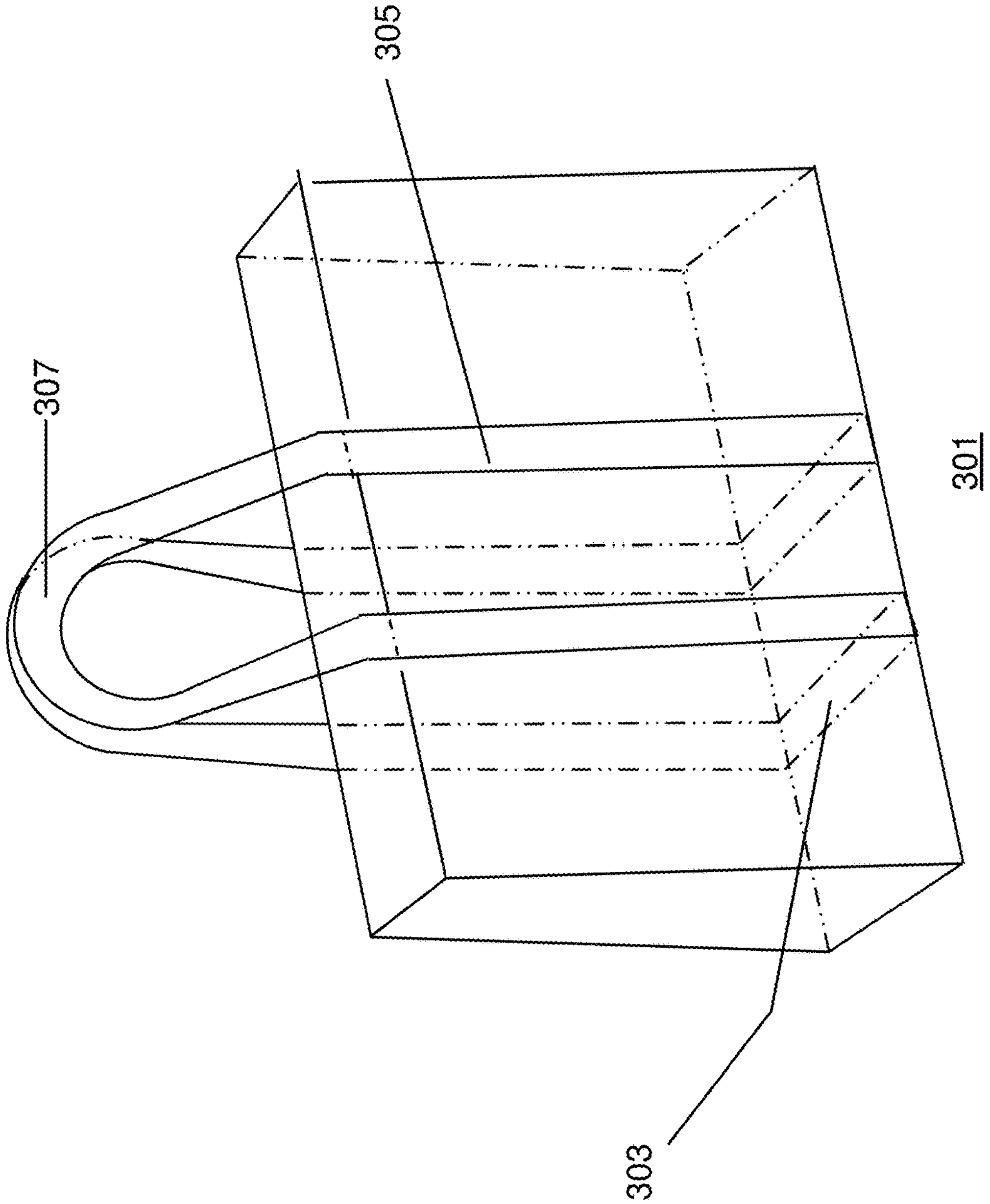
FIG. 3 displays detailed bag handle with a reinforcing strip forming the paper bag handles contiguous with the reinforcing strip in one loop and coupled to the bag in an embodiment of the invention.

FIG. 3 displays a loop integrated bag handle with reinforcing strip forming the paper bag handles and the reinforcing strip in one continuous loop and firmly coupled to the bag in an embodiment of the invention Bag handle 307 strengthening strips can be formed from paper strip with adhesives or tape vertically along the length of the bag side 305 where handles are attached, using materials such as cloth to paper, twisted twine reinforced paper strips, and or nylon handles using strong adhesive, staples or other coupling. All of these coupling methods can be used in an embodiment for reinforcing bottoms with strips 303, and or through torrefication of bag reinforcement strips or loop.

In an embodiment one continuous reinforcement loop is shown circumscribing a paper bag forming side 305, and bottom 303 bag reinforcement strips continuous with the bag handles 307. The material used for the reinforcing loop is stronger than the bag paper using such strengtheners as embedded twisted rope or twine, thread through loop and bag stitching, cloth, various glues and adhesives and torrefaction. In an embodiment a reinforcement strip that is configured in a continuous loop 305 303 307 forming two opposing handles 307 in at least one bag traversing reinforcement loop.

Water-repelling and reinforced Kraft Paper with biobased coating can be used for the reinforcing strip layer material as well. Ecofriendly coatings for bag 301 paper are available in the form of a biobased coating material using crosslinked alkyl chitosan which enhance the properties of kraft paper. Dip-coating of kraft papers, and such coated kraft papers have significant improvement in mechanical properties, hydrophobicity, good tolerance to sandpaper abrasion, and adhesive tape peeling. These all strengthen the reinforcement strips or loop of the reinforced paper bag 301.

Figure 4:
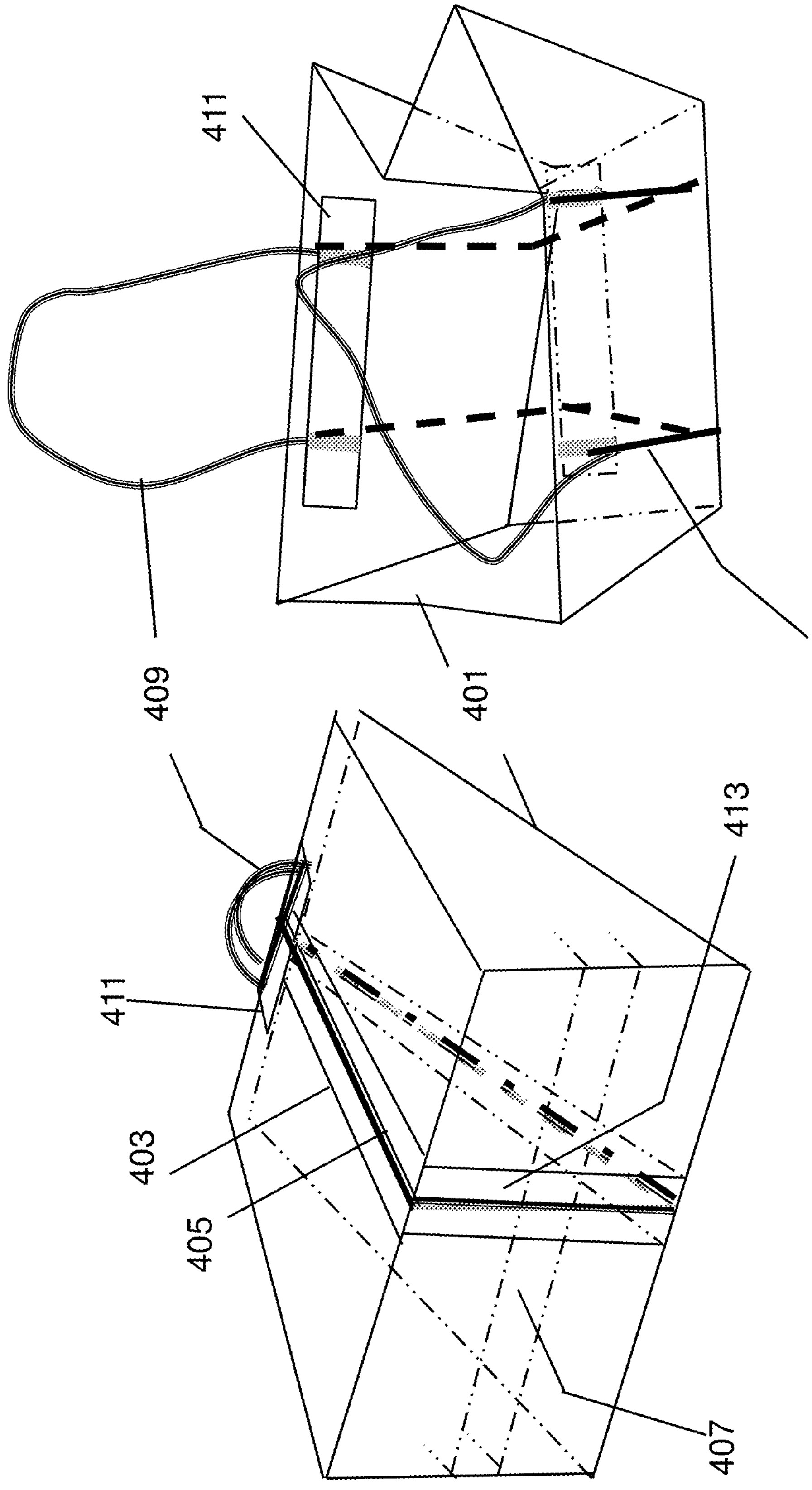
FIG. 4 shows paper bags with alternate configuration reinforced bag handles coupled with bag reinforcement loop in an embodiment of the invention.

FIG. 4 shows paper bags with alternate configuration reinforced bag handles coupled with bag reinforcement loop in an embodiment of the invention.

In an embodiment reinforced paper bag handles 409 with reinforced loops made from twisted rope, twine 415 or layered strip 413, coupled with and circumscribe a paper bag 401. These provide additional structural support to an otherwise thin paper walled materially weak bottom bag, resisting bag forming and tearing or weakening from moisture. This adds the reliability required to a typical paper bag as an effective carrier alternative, as a reinforced bag is better able to withstand internal weight pressures and damage from various paper bag carried groceries and sundry items. In an embodiment the bag bottom surface may have a reinforcing strip 407 perpendicular to a reinforcement twine strip loop 405 coupled to a bag handle 409 via a strip anchor 411.

Figure 5:
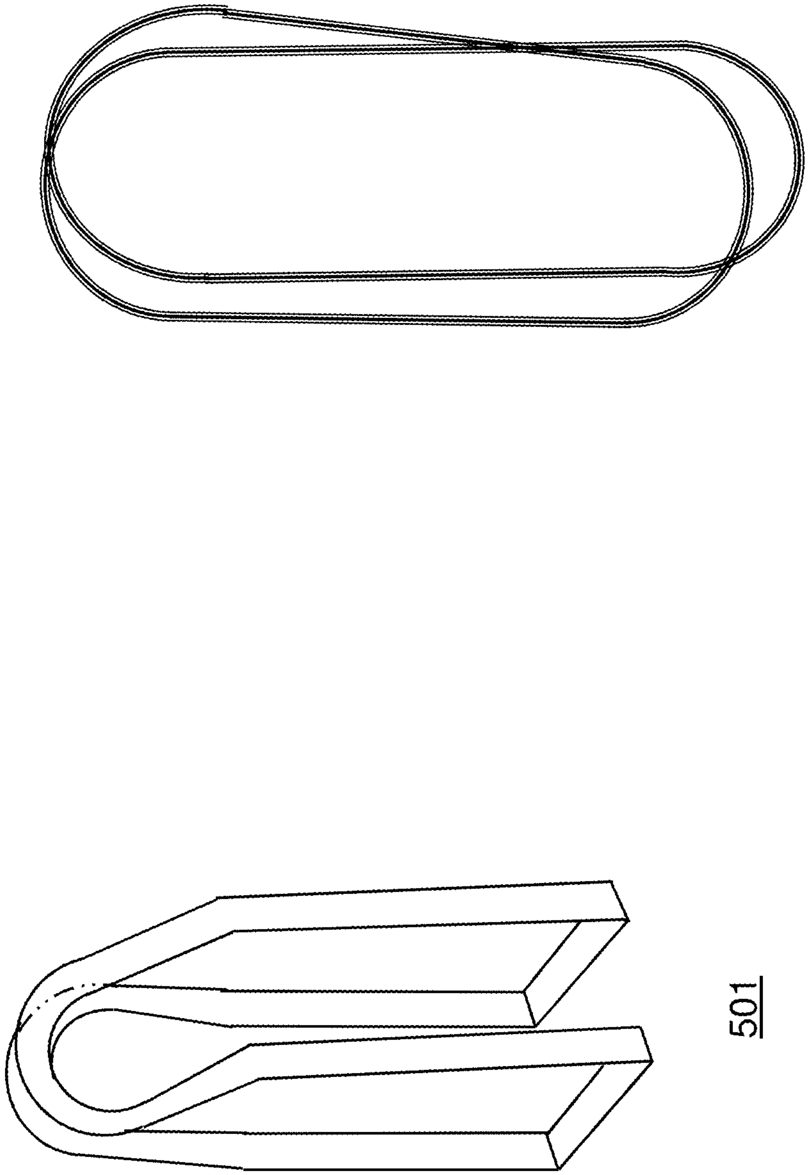
FIG. 5 displays standalone reinforcement loops in an embodiment of the invention

Reinforcement strip material can be folded strength enhanced paper, torrofacted paper, threaded paper, cloth blend, cloth paper, wax paper, tape, ribbon, kraft paper, reinforced twisted, folded paper and biodegradable plastic. Reinforced strip to bag coupling can be from sewn thread, staples, staple, tape, acrylic varnish and glues and adhesives of all types, Reinforced bag handles can be made of reinforced paper, folded paper, torrefaction treated paper, ribbon, composite paper, thread, cloth paper composite, reinforced twisted fiber, tape, ribbon and cloth FIG. 5 displays standalone reinforcement loops in an embodiment of the invention. The one segment continuous loops in continuous strip 501 and twine or twisted rope 503 are illustrated here to show that they can simplify the reinforcement of present paper bag manufacturing process using the current paper bag manufacturing machinery through the addition of a single loop to a paper bag outside.

Figure 6:
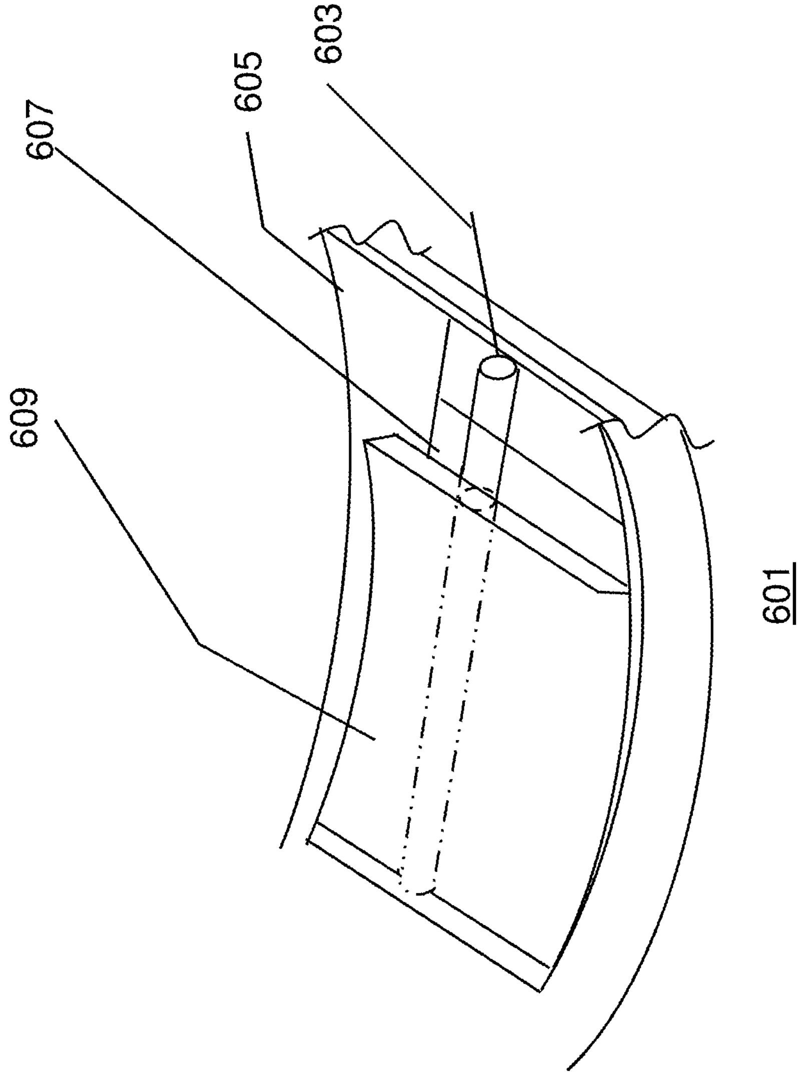
FIG. 6 illustrates standalone reinforcement strip layers in embodiments of the invention.

FIG. 6 illustrates reinforcement strip layer composition in embodiments of the invention. The addition of paper bag reinforcement strip 601 to the paper manufacturing bag sides and bottom can be small extensions of the processing done by the addition of incremental automation to the current paper bag manufactures. For example with the one loop twisted rope handle paper bag, the twisted rope can without radical machine changes, be extended along and coupled with the reinforcing side and bottom bag strips, to add strength and integration to the paper bag via reinforcement strips having a twisted rope and or other supporting strip layers the entire paper bag from the current twisted rope handles. It is anticipated that the incremental addition of material and processing would not be a substantial change in cost, once the factor machine changes are made.

In an embodiment the reinforcement strip 601 will adhere to the paper bag 605 with an adhesive glue 607 and an outer tape 609 material. In some embodiments the adhesive layer 607 can embed a twisted rope or twine 605 for added strength.

Material composition by strip layers in various handle embodiments can be made of paper, twine, leather, cloth, metal or layer coupled combinations. Reinforcement strip layer couplings can be from acrylic varnish, glues of all types, thread, flexible material like plastics, staples and twine. when integrated with the paper bag reinforcement strips.

Torrefaction—By wetting a paper layer strip and then heating in low oxygen environment one greatly increases the strength of a paper fiber reinforcement strips. In addition, torrefied biomaterial has hydrophobic properties, i.e., repels water, and when combined with densification increases resilience in open air. Moreover when applied to a paper bag bottom, if some liquid were to leak from a grocery then the bottom the bag would resist the bag paper becoming soft enough for ripping from a weakened moistened paper bottom and subsequent grocery spillage. Some of this comes with the kraft paper bag and more can be added to strengthen the paper bag bottom.

What is claimed is:

1. An reinforced paper bag comprising:

a paper bag with four lateral sides, a bottom and two handles at the bag top edge;

the two handles on opposite sides of the paper bag configured for carrying objects inside the paper bag;

each handle coupled to at least one paper bag reinforcement strip;

the reinforcement strip material comprising torrofacted paper, and each bag reinforcement strip coupled to the paper bag surface and traversing the paper bag from one paper bag handle, across the bag bottom surface, traversing the opposite side surface and to the opposite side handle whereby a paper bag having reinforcement strips from at least one reinforcement strip coupling the two handles and traversing the bag side surfaces and bottom surface provides heavier load carrying capacity to the reinforced bag.

2. A reinforced paper bag as in claim 1 further comprising a reinforcement strip that is configured in a continuous loop forming two opposing handles and at least one bag traversing reinforcement loop.

3. A reinforced paper bag as in claim 1 further comprising reinforcement strip material selected from a set of strip materials comprising folded strength enhanced paper, threaded paper, cloth blend, cloth paper, wax paper, tape, ribbon, kraft paper, reinforced twisted, folded paper and biodegradable plastic.

4. A reinforced paper bag as in claim 1 further comprising coupling the reinforcement strip and bag from a group of coupling material comprising thread, staples, staple, acrylic varnish and glues of all types.

5. A reinforced paper bag as in claim 1 further comprising bag handles made of material from a group consisting reinforced paper, folded paper, ribbon, composite paper, thread, cloth paper composite, reinforced twisted fiber, ribbon and cloth.

6. A reinforced paper bag as in claim 1 further comprising a reinforcing strip traversing the bag bottom and perpendicular to the bag handle side reinforcing strips traversing the bag bottom.

7. A method for a reinforced paper bag further comprising the steps of:

providing a paper bag with four lateral sides, a bottom and two handles at the bag open top edge;

coupling the two handles on opposite sides of the paper bag top edge for carrying contents inside the paper bag by the two handles;

firmly coupling each handle to at least one paper bag reinforcement strip;

each bag reinforcement strip traversing the paper bag surface from one paper bag handle, traversing the bag from one handle side to and across the bag bottom surface, progressing to the opposite side surface, and coupling with the opposite side handle;

using water repellant torrofacted paper material for reinforcement strips for protection against bag water damage, and coupling the at least one bag reinforcement strip adhering to the bag surface from handle to handle whereby a paper bag having reinforcement strips forming a loop from at least one reinforcement strip coupling the two handles and traversing the bag sides and bottom adding carrying capacity to the bag.

8. A method for reinforced bag as in claim 7 further comprising the steps of configuring a reinforcement strip in a continuous loop forming two opposing handles continually connecting a reinforced strip traversing and adhering to the bag surface from handle to handle.

9. A method for a reinforced paper bag as in claim 7 further comprising the steps of using reinforcement strip material selected from a set of strip materials comprising folded strength enhanced paper, threaded paper, cloth blend, cloth paper, wax paper, tape, ribbon, kraft paper, reinforced twisted, folded paper and biodegradable plastic.

10. A method for a reinforced bag as in claim 7 further comprising the steps of coupling the reinforcement strip to the bag from a group of coupling mechanisms comprising thread, staples, staple, acrylic varnish and glues of all types.

11. A method for a reinforced bag as in claim 7 further comprising the steps of providing bag handles made of material from a group consisting reinforced paper, folded paper, ribbon, composite paper, thread, cloth paper composite, reinforced twisted fiber, ribbon and cloth.

12. A method for a reinforced bag as in claim 7 further comprising the steps of placing a reinforcing strip traversing the bag bottom and perpendicular to the bag handle side reinforcing strips traversing the bag bottom.

* * * * *